United States Patent

Ochiai

[11] Patent Number: 5,545,107
[45] Date of Patent: Aug. 13, 1996

[54] LOCKUP CLUTCH CONTROL RELEASE INHIBITING DURING SHIFTING FOR AUTOMATIC TRANSMISSIONS

[75] Inventor: Tatsuo Ochiai, Fujisawa, Japan

[73] Assignee: Nissan Motor Co., Ltd., Yokohama, Japan

[21] Appl. No.: 356,735

[22] Filed: Dec. 15, 1994

[30] Foreign Application Priority Data

Dec. 27, 1993 [JP] Japan .................................. 5-332959

[51] Int. Cl.$^6$ .................................................. F16H 47/06
[52] U.S. Cl. ............................................. 477/63; 477/169
[58] Field of Search ................................ 477/62, 63, 64, 477/168, 169, 174, 175

[56] References Cited

U.S. PATENT DOCUMENTS 4,516,671  5/1985  Nishikawa et al. ..................... 477/169
4,662,488  5/1987  Hiramatsu et al. ..................... 477/62 X
4,744,031  5/1988  Takeda et al. ......................... 477/63 X
5,115,896  5/1992  Noguchi et al. ....................... 477/62 X
5,133,232  7/1992  Kikuchi et al. ....................... 477/62 X
5,417,622  5/1995  Asyama et al. ........................... 477/63

OTHER PUBLICATIONS

Maintenance Manual, "Nissan RE4R01A Full-Range Electronic Control Automatic Transmission", (1987), pp. 1-6 -1-90.

*Primary Examiner*—Khoi Q. Ta
*Attorney, Agent, or Firm*—Foley & Lardner

[57] ABSTRACT

A lockup control system for automatic transmissions is constructed to prohibit lockup interruption control during shifting when the cruising state of a motor vehicle is such that a difference between an engine speed before and after shifting is smaller than a set value.

6 Claims, 4 Drawing Sheets

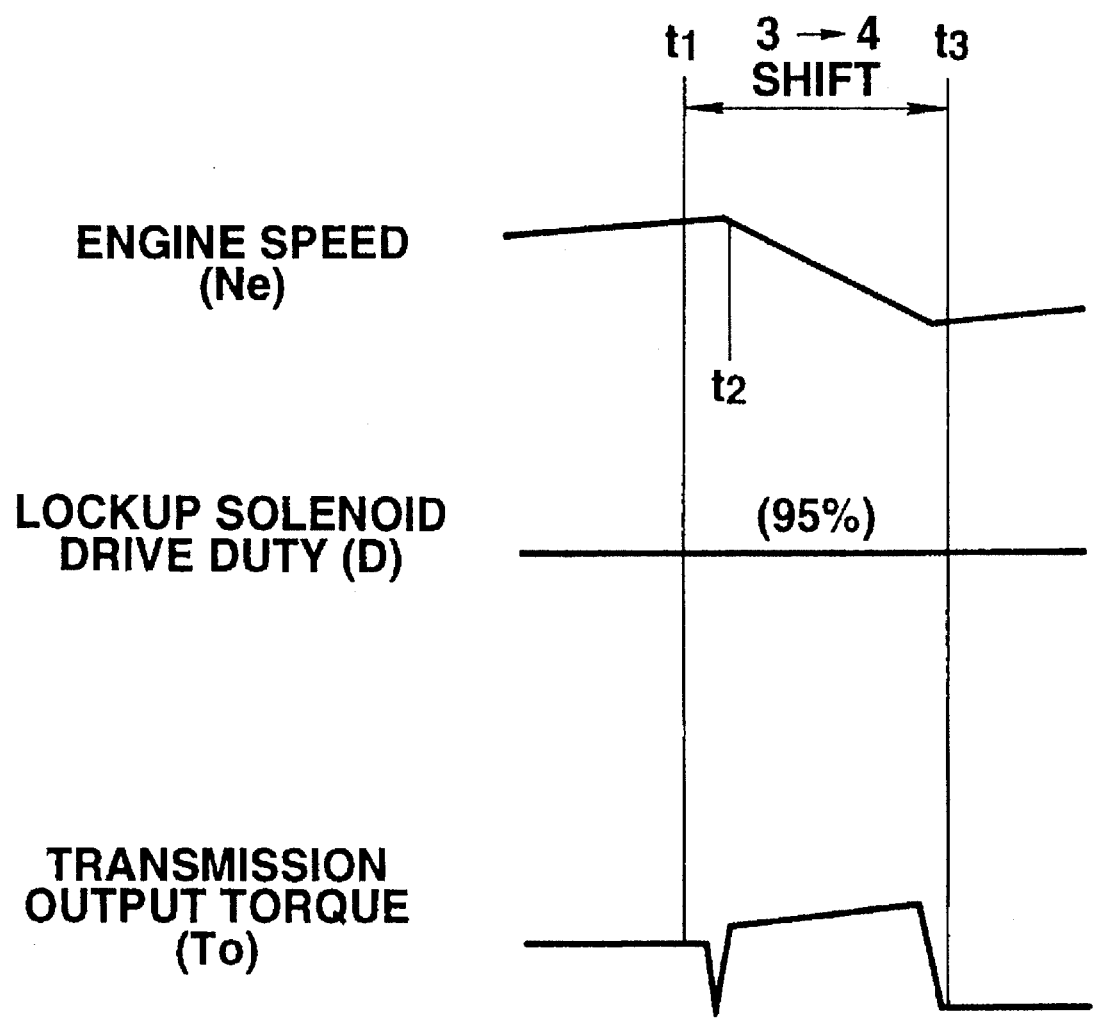

LOCKUP CLUTCH CONTROL RELEASE INHIBITING DURING SHIFTING FOR AUTOMATIC TRANSMISSIONS

BACKGROUND OF THE INVENTION

The present invention relates to a system for carrying out lockup control during shifting of automatic transmissions for motor vehicles.

In order to improve fuel consumption by improvement of the transmission efficiency, the automatic transmissions of the lockup type are becoming more popular. In a lockup type, when the torque increasing function or torque variation absorbing function is not needed, a torque converter can be put in the lockup state wherein input and output elements thereof are directly coupled.

Conventionally, lockup control of such torque converter is carried out, for example, in a way as described in Maintenance Manual of NISSAN RE4R01A Type Full-Range Electronic Control Automatic Transmission. That is, it is determined in which area the cruising state of a motor vehicle is found, in a lockup area or converter area which are defined by the throttle opening or engine load and the vehicular velocity in connection with a predetermined speed or every speed, and in accordance with a result of determination, the torque converter is put in the lockup state wherein the input and output elements thereof are directly coupled or in the converter state wherein direct coupling of the input and output elements thereof is released.

An object of the present invention is to provide a lockup control system for automatic transmissions, which system contributes to a reduction in shift shock upon shifting in the cruising state of the motor vehicle such that no great difference is found between an engine speed before and after shifting.

SUMMARY OF THE INVENTION

According to one aspect of the present invention, there is provided a system for carrying out lockup control of an automatic transmission for a motor vehicle having a cruising state in a lockup area and a converter area, the automatic transmission being provided with a torque converter having a lockup state wherein input and output elements thereof are directly coupled and a converter state wherein direct coupling of the input and output elements is released, the system comprising:

means for interruptedly releasing the torque converter from in the lockup state when the cruising state of the motor vehicle is found in the lockup area;

means for detecting the cruising state of the motor vehicle such that a difference between an engine speed before and after shifting is smaller than a predetermined value and generating a cruising state signal when said the cruising state is detected; and means for prohibiting operation of said interruptedly releasing means when said cruising state signal is generated.

According to another aspect of the present invention, there is provided a method of carrying out lockup control of an automatic transmission for a motor vehicle having a cruising state in a lockup area and a converter area, the automatic transmission being provided with a torque converter having a lockup state wherein input and output elements thereof are directly coupled and a converter state wherein direct coupling of the input and output elements is released, the method comprising the steps of:

interruptedly releasing the torque converter from in the lockup state when the cruising state of the motor vehicle is found in the lockup area;

detecting the cruising state of the motor vehicle such that a difference between an engine speed before and after shifting is smaller than a predetermined value and generating a cruising state signal when said the cruising state is detected; and prohibiting operation of said interruptedly releasing means when said cruising state signal is generated.

According to still another aspect of the present invention, there is provided, in a motor vehicle having a cruising state in a lockup area and a converter area:

an automatic transmission provided with a torque converter having a lockup state wherein input and output elements thereof are directly coupled and a converter state wherein direct coupling of said input and output elements is released;

a controller connected to said automatic transmission, said controller including:

means for interruptedly releasing said torque converter from said lockup state when the cruising state of the motor vehicle is found in the lockup area;

means for detecting the cruising state of the motor vehicle such that a difference between an engine speed before and after shifting is smaller than a predetermined value and generating a cruising state signal when said the cruising state is detected; and means for prohibiting operation of said interruptedly releasing means when said cruising state signal is generated.

BRIEF DESCRIPTION OF THE DRAWINGS

FIG. 3 is a time chart of lockup control executed by the lockup control system of the present invention;

DETAILED DESCRIPTION OF THE INVENTION

Figure 1:
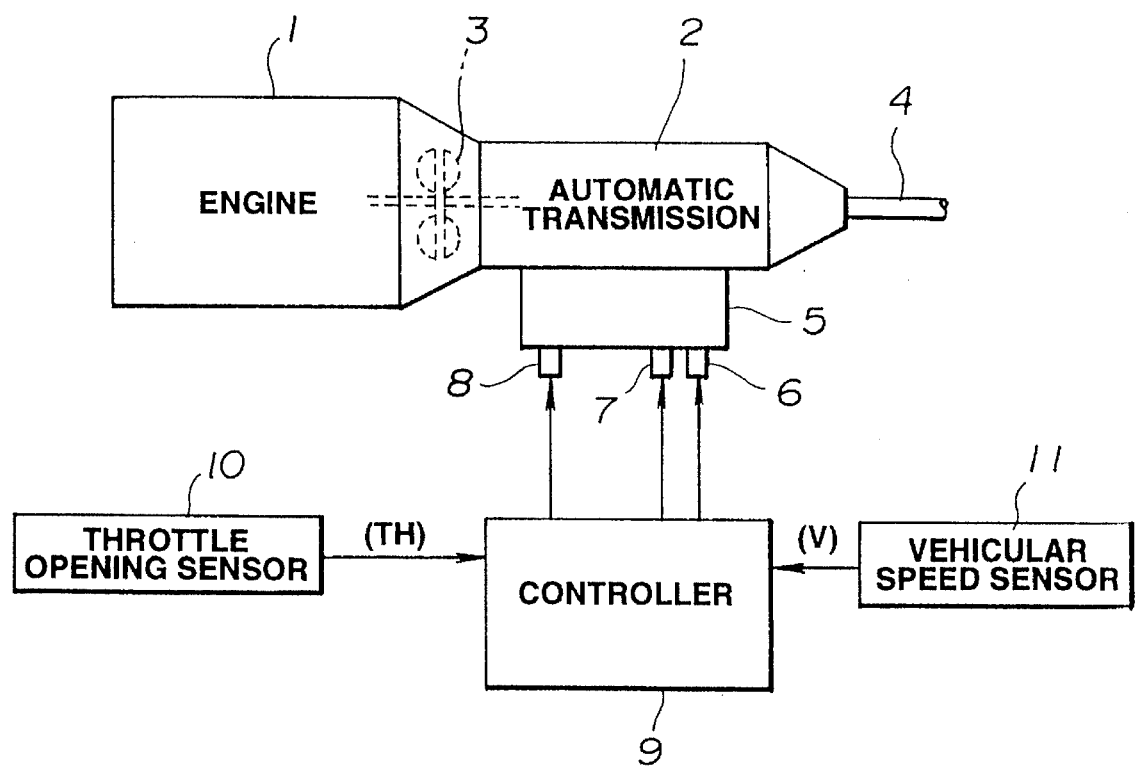
FIG. 1 is a block diagram showing a preferred embodiment of a lockup control system for automatic transmissions according to the present invention.

Referring to the drawings, a preferred embodiment of a lockup control system for automatic transmissions will be described.

Before entering a description of the preferred embodiment of the present invention, a further description will be made with regard to the conventional lockup control system.

The effect of improvement in fuel consumption by lockup of the torque converter can be increased by carrying out lockup thereof at named speeds as possible. In that case, however, shift occurs in the lockup area, i.e., shift is carried out with the torque converter locked up, which produces great shift shock since the torque converter fails to provide the torque variation absorbing function. This is particularly prominent when the automatic transmission fulfills upshift from low speed to high speed under a certain engine throttle opening.

Thus, ordinarily, lockup of the torque converter is temporarily interrupted during shift in the lockup area to put the torque converter in the converter state once, alleviating shift shock by the torque variation absorbing function thereof. After shifting, the state of the torque converter is returned to the lockup state in view of the lockup area.

Figure 4A:
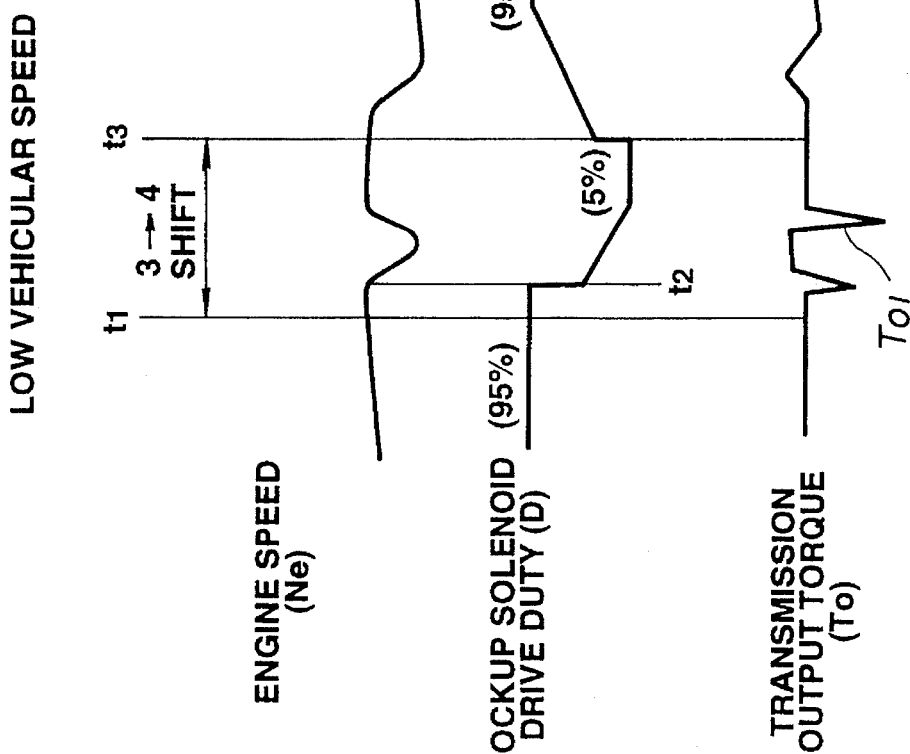
FIG. 4A is a view similar to FIG. 3, showing lockup interruption control during shifting at high vehicular velocity executed by a conventional lockup control system.

Referring to FIG. 4A, this operation will be described with regard to shifting from third speed to fourth speed in the lockup area at high vehicular velocity. After a time $t_2$ lagging from a shift command time $t_1$ by a shift response, a drive duty D of a lockup solenoid is gradually decreased from 95% at which the torque converter is put in the lockup state to 5% at which the torque converter is put in the converter state so as to temporarily interrupt lockup of the torque converter. At a shift completion time $t_3$, the drive duty D of the lockup solenoid is gradually increased from 5% to 95% so as to return the state of the torque converter to the lockup state.

Such temporary interruption of lockup of the torque converter during a period of shifting serves to alleviate shift shock. That is, with a changeover of speed, an engine speed Ne is changed as shown in FIG. 4A, which produces shift shock due to a difference between the engine speed before and after shifting. As seen from a variation waveform of an output torque To of the automatic transmission in FIG. 4A, this shift shock can be alleviated by the torque variation absorbing function of the torque converter.

Figure 4B:
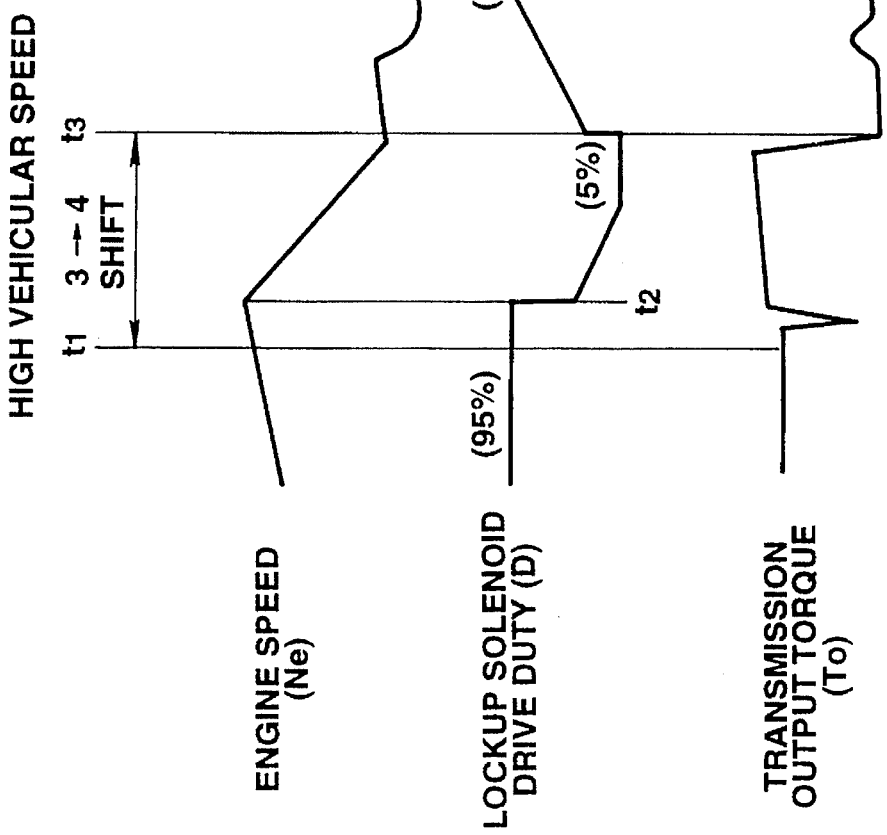
FIG. 4B is a view similar to FIG. 4A, showing lockup interruption control during shifting at low vehicular velocity executed by the lockup control system of the present invention.

However, if such lockup interruption control during shifting is also carried out at low vehicular velocity, the following problem arises. Referring to FIG. 4B, which shows an operation of lockup interruption control carried out under the same conditions as those in FIG. 4A, the engine speed Ne in the lockup state at third speed before shifting can practically be equal to that one in the converter state at fourth speed after shifting, or the former can be lower than the latter. If the same lockup interruption control as that one at high vehicular velocity is carried out under such condition, the engine speed Ne undergoes a sudden increase on the way, resulting in unnatural variation of the engine speed Ne during shifting, and production of a depression $To_1$ of the output torque To of the automatic transmission which causes a discernible feeling of being shifted.

FIG. 1 shows a lockup control system for automatic transmissions embodying the present invention, wherein reference numeral 1 designates an engine 1, and 2 designates an automatic transmission. The automatic transmission 2 inputs power of the engine 1 through a torque converter 3, and changes input rotation at the gear ratio corresponding to a selected speed, which is transmitted to an output shaft 4.

The automatic transmission 2 has a selected speed determined by a combination of turning-on and turning-off of shift solenoids 6, 7 in a control valve 5. By duty control of a lockup solenoid 8 in the control valve 5, the torque converter 3 is put in the converter state or in the lockup state.

A controller 9 is arranged to control turning-on and turning-off of the shift solenoids 6, 7 and the drive duty D of the lockup solenoid 8. The controller 9 inputs a signal derived from a throttle opening sensor 10 for sensing a throttle opening TH of the engine 1, and a signal derived from a vehicular velocity sensor 11 for sensing a vehicular velocity V through the rotating speed of the output shaft 4 of the automatic transmission 2.

In accordance with the above input information, the controller 9 carries out a well-known computation (not shown) for shift control and ordinary lockup control. As to shift control, a predetermined shift is carried out through operation of determination of an optimal speed for the actual cruising state by, for example, the table look-up method in accordance with the throttle opening TH and the vehicular velocity V, and turning-on and turning-off of the shift solenoids 6, 7 to select the optimal speed.

As to ordinary lockup control, it is determined in which area the cruising state of a motor vehicle is found, in the lockup area or converter area which are defined by the throttle opening TH and the vehicular velocity V in connection with a predetermined speed or every speed, and in accordance with a result of the, the torque converter 3 is put in the lockup state or in the converter state through duty control of the lockup solenoid 8. The lockup state of the torque converter 3 is obtained by setting the drive duty D of the lockup solenoid 8 at 95%, whereas the converter state of the torque converter 3 is obtained by setting the drive duty D of the lockup solenoid 8 at 5%.

Figure 2:
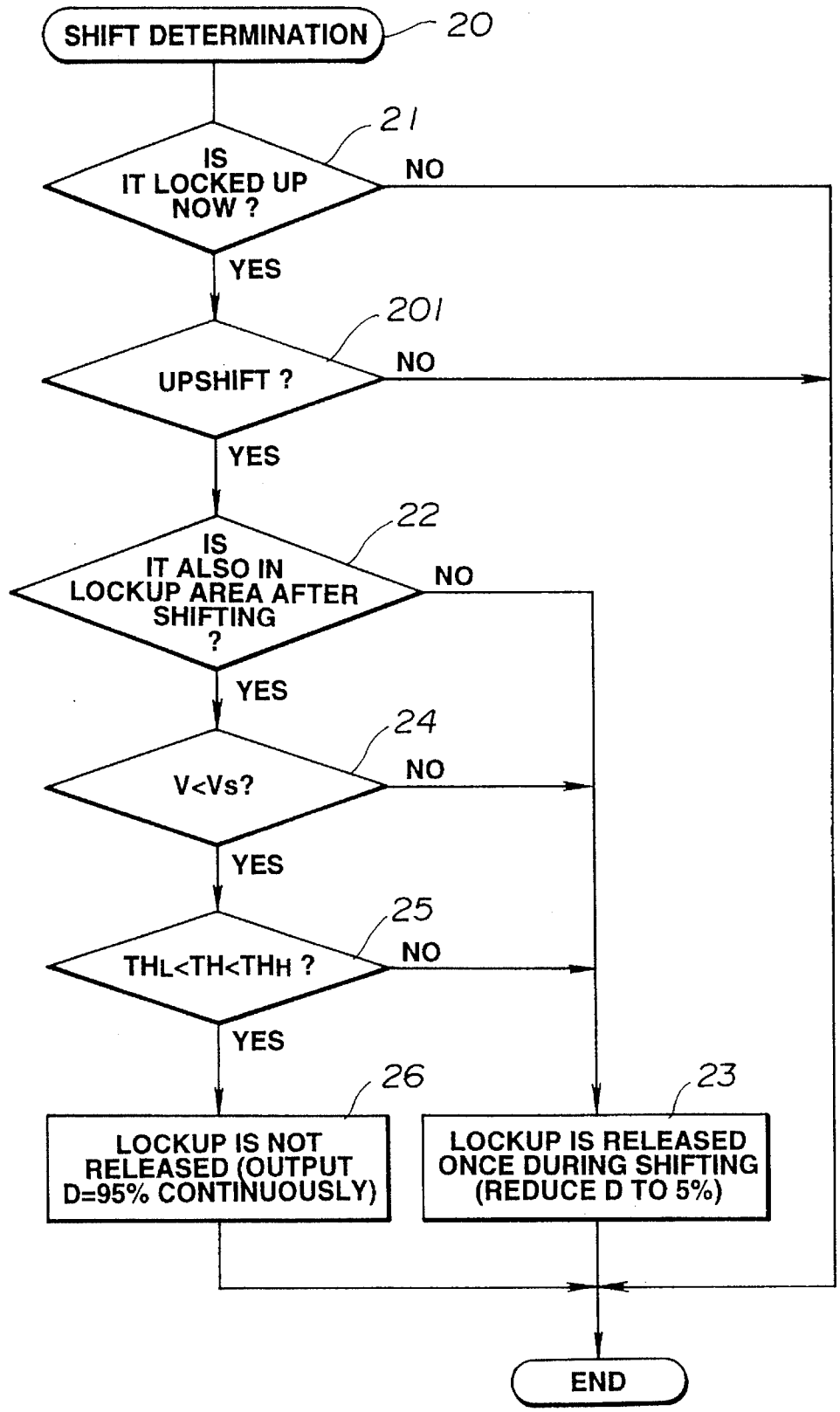
FIG. 2 is a flowchart showing operation of the preferred embodiment of the present invention.

Moreover, the controller 9 carries out lockup control of the torque converter 3 during shifting in accordance with a control program as shown in FIG. 2, which is a main object of the present invention. At a step 20, the control program in FIG. 2 is started whenever a command of a changeover of speed or shift is generated. First, at a step 21, it is determined whether or not the torque converter 3 is actually locked up out of the drive duty D of the lockup solenoid 8. If it is determined that the torque converter 3 fails to be locked up, control is terminated to carry out the above ordinary lockup control.

On the other hand, at the step 21, if it is determined that the torque converter 3 is actually locked up, control proceeds to a step 201 where it is determined whether or not upshift is carried out. If it is determined that upshift is carried out, control proceeds to a step 22 where it is checked whether or not the cruising state of the motor vehicle is also found in the lockup area after shifting; this shifting is carried out in the lockup area. In case that the cruising state fails to be found in the lockup area after shifting, the torque converter 3 locked up should be put in the converter state, so that at a step 23, the drive duty D of the lockup solenoid 8 is set at 5% to change the state of the torque converter 3 from the lockup state to the converter state.

On the other hand, at the step 22, if it is determined that the cruising state is also found in the lockup area after shifting, which is carried out in the lockup area, it is determined at steps 24 and 25 whether or not the vehicular velocity V is low and smaller than a set value Vs (V<Vs), and the throttle opening TH is between a lower set value $TH_L$ and an upper set value $TH_H$ ($TH_L$< TH<$TH_H$). It is to be noted that the set values Vs, $TH_L$, $TH_H$ of the vehicular velocity V and throttle opening TH are determined to detect the cruising state of the motor vehicle such that the difference between the engine speed Ne before and after shifting is smaller than a tiny set value.

At the steps 24 and 25, it is determined that the vehicular velocity V fails to be low and smaller than the set value Vs, or that the throttle opening TH fails to be between the lower set value $TH_L$ and the upper set value $TH_H$, i.e., the cruising state of the motor vehicle is such that the difference between the engine speed Ne before and after shifting is greater than the set value, control at the step 23 is executed to carry out lockup interruption control during shifting, eliminating harmful effects of an occurrence of great shift shock.

On the other hand, at the steps 24 and 25, if it is determined that the cruising state of the motor vehicle is such that the difference between the engine speed Ne before and after shifting is smaller than the set value, control proceeds to a step 26 where the drive duty D of the lockup solenoid 8 is maintained at 95% so as to preserve the lockup state of the torque converter 3, practically prohibiting lockup interruption control during shifting as described above. That is, in such cruising state of the motor vehicle, even during shifting in the lockup area, lockup interruption control during shifting fails to be fulfilled by maintaining the drive duty D of the lockup solenoid 8 at 95% as seen from FIG. 3, which shows shift carried out under the same conditions as those in FIG. 4B.

In such cruising state of the motor vehicle, when carrying out lockup interruption control during shifting in an ordinary way, the engine speed Ne undergoes a sudden increase on the way, resulting in unnatural variation of the engine speed Ne during shifting, and production of a depression of the output torque of the automatic transmission 2, which causes discernable feeling of being shifted described in connection with FIG. 4B. However, according to the structure of this embodiment wherein lockup interruption is prohibited in such cruising state, the above problem can be prevented from occurring as seen from the variation waveforms of the engine speed Ne and the output torque To of the automatic transmission 2 as shown in FIG. 3.

Having described the present invention in connection with the preferred embodiment, it is to be noted that the present invention is not limited thereto, and various changes and modifications are possible without departing from the spirit of the present invention.

What is claimed is:

1. A system for carrying out lockup control of an automatic transmission for a motor vehicle, which automatic transmission being provided with a torque converter operable in a lockup state when the vehicle is cruising in a lockup area, wherein input and output elements thereof are directly coupled, and operable in a converter state when the vehicle is moving in a converter area, wherein direct coupling of the input and output elements is released, the system comprising:

means for interruptedly releasing the torque converter from the lockup state during shifting when the vehicle is cruising in the lockup area;

means for detecting whether the vehicle is cruising in the lockup area, where a difference between an engine speed before and after shifting is smaller than a predetermined value and generating a cruising state signal when the vehicle cruising in the lockup area is detected; and means for prohibiting operation of said interruptedly releasing means when said cruising state signal is generated.

2. A system as claimed in claim 1, wherein said detecting means comprises:

means for determining whether or not a vehicular velocity is smaller than a predetermined value; and means, responsive to said vehicular velocity determining means, for determining whether or not a throttle opening is between first and second predetermined values.

3. A method of carrying out lockup control of an automatic transmission for a motor vehicle, which automatic transmission being provided with a torque converter operable in a lockup state when the vehicle is cruising in a lockup area, wherein input and output elements thereof are directly coupled, and operable in a converter state when the vehicle is moving in a converter area, wherein direct coupling of the input and output elements is released, the method comprising the steps of:

interruptedly releasing the torque converter from the lockup state during shifting when the vehicle is cruising in the lockup area;

detecting whether the vehicle is cruising in the lockup area, where a difference between an engine speed before and after shifting is smaller than a predetermined value and generating a cruising state signal when the vehicle cruising in the lockup area is detected; and prohibiting interruptedly releasing of said torque converter when said cruising state signal is generated.

4. A method as claimed in claim 3, wherein said detecting step comprises the steps of:

determining whether or not a vehicular velocity is smaller than a predetermined value; and determining responsive to said vehicular velocity determining step whether or not a throttle opening is between first and second predetermined values.

5. A motor vehicle capable of cruising in a lockup area and moving in a converter area, comprising:

an automatic transmission provided with a torque converter and operable in a lockup state when the vehicle is cruising in the lockup area, wherein input and output elements thereof are directly coupled, and operable in a converter state when the vehicle is cruising in the converter area, wherein direct coupling of the input and output elements is released;

a controller connected to said automatic transmission, said controller including:

means for interruptedly releasing the torque converter from in the lockup state during shifting when the vehicle is cruising in the lockup area;

means for detecting whether the vehicle is cruising in the lockup area, where a difference between an engine speed before and after shifting is smaller than a predetermined value and generating a cruising state signal when the vehicle cruising in the lockup area is detected; and means for prohibiting operation of said interruptedly releasing means when said cruising state signal is generated.

6. A motor vehicle as claimed in 5, wherein said detecting means comprises:

means for determining whether or not a vehicular velocity is smaller than a predetermined value; and means, responsive to said vehicular velocity determining means, for determining whether or not a throttle opening is between first and second predetermined values.

* * * * *